United States Patent Office 3,143,573
Patented Aug. 4, 1964

3,143,573
PROCESS FOR PREPARING α-KETOALDEHYDES
Hans Jürgen Bestmann, Munich, Germany, assignor to Farbwerke Hoechst Aktiengesellschaft vormals Meister Lucius & Brüning, Frankfurt am Main, Germany, a corporation of Germany
No Drawing. Filed Nov. 1, 1960, Ser. No. 66,421
Claims priority, application Germany Nov. 5, 1959
5 Claims. (Cl. 260—592)

α-Ketoaldehydes have found a particular interest because of the fact that they offer a variety of reaction possibilities and that they have partly considerable anti-virus activity. Several processes for preparing them are known. The majority of these processes uses methylketones as starting substances which, for example, are oxidized with selenium dioxide or converted by means of esters of the nitrous acid into oximes or isonitrosoketones, and the latter are subsequently split into α-ketoaldehydes. However, the oxidation process with selenium dioxide as described above has the disadvantage that if methyl-ketones are used that have a longer chain, not only the $CH_2$ group adjacent to the carbonyl group but also the $CH_3$ group can be attacked so that no uniform products are obtained. The same is true of the reaction of methyl-ketones with the esters of nitrous acid.

Another way leading to α-ketoaldehydes starts from acetols of the type R—CO—$CH_2$—O—CO—$CH_3$ (R=hydrocarbon radical). In this case the terminal $CH_2$ group which carries the acetoxy group is brominated. When caused to decompose in vacuo, the compound so obtained yields α-ketoaldehyde. Furthermore, pyridinium salts of α-haloketones have been reacted with aryl-nitroso compounds to form the corresponding nitrons which, upon hydrolysis, yield α-ketoaldehydes. Another known possibility of preparing α-ketoaldehydes is based on the following reaction scheme:

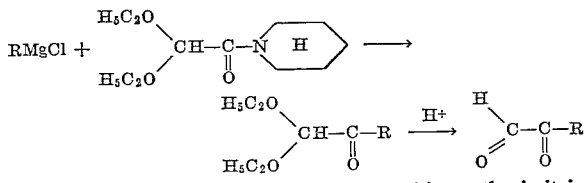

where R is a hydrocarbon radical. In this synthesis it is very difficult to split the acetals.

Now, we have found that α-ketoaldehydes can be prepared in simple manner by a smooth reaction and in good yield by reacting α-ketotriphenylphosphazines or their hydrolysis products, the α-ketoaldehyde-alhydrazones, with nitrous acid or its esters.

The reaction of the present invention proceeds as shown below:

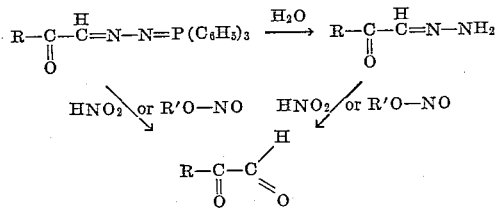

wherein R is a substituted or unsubstituted alkyl, aryl or heterocyclic radical and R' is hydrogen or alkyl.

The α-ketotriphenylphosphazines can be easily obtained from appropriate carboxylic acids via the diazoketones. The phosphazines are split by hydrolysis to α-ketoaldehyde-al-hydrazones.

As α-ketotriphenylphosphazines there may be used glyoxaltriphenylphosphazines which carry aliphatic as well as aromatic or heterocyclic substituents. As examples thereof there are mentioned: methylglyoxal-, ethylglyoxal-, tert. butylglyoxal-, amylglyoxal-, hexylglyoxal-, hydroxymethylgloxal-, methoxy- and ethoxymethylglyoxal-, 3-methoxy- and 3-ethoxyethylglyoxaltriphenylphosphazines, phenylglyoxal-triphenylphosphazine and the derivatives thereof which are substituted in the aromatic radical, for example, by nitro, methyl, hydroxy, methoxy, acetamido, carboxy and carbomethoxy groups or by halogens, in particular chlorine and bromine, naphthylglyoxal-tripenylphosphazines and the corresponding substitution products thereof, furaneglyoxal- and thiophenylglyoxal-triphenylphosphazines. Instead of the above α-ketotriphenylphosphazines there may also be used as starting materials the α-ketoaldehyde-al-hydrazones obtainable therefrom by hydrolysis.

The α-ketotriphenylphosphazines or their hydrolysis products the α-ketoaldehyde-al-hydrazones, are converted by nitrous acid or the esters thereof, in an acid medium, into α-ketoaldehydes. In general, the α-ketotriphenylphosphazine or the corresponding hydrazone used as starting material is dissolved or suspended in an organic solvent or diluent, and to the solution or dispersion is added, while cooling with ice water, the aqueous solution of a nitrite. After acidification, the reaction mixture is allowed to stand for some time during which the reaction proceeds smoothly at room temperature. In order to complete the reaction it may be advantageous to heat the reaction mixture for some time to an elevated temperature, for example, 30–50° C., after the evolution of gas has ceased. Instead of the free nitrous acid, there may also be used the esters of nitrous acid. As examples there are mentioned: the esters with low molecular aliphatic alcohols, such as methyl nitrite, ethyl nitrite, butyl nitrite, isobutyl nitrite, amyl nitrite, and the like.

As organic solvents or diluents there are advantageously used those which are to a great extent, or completely, miscible with water and which do not react with the reaction components. As examples, there are mentioned: ketones, such as acetone, cyclic ethers, such as dioxane or tetrahydrofurane, dimethylformamide, dimethylsulfoxide, acetonitrile, and the like.

In case the reaction proceeds too violently it is advantageous to operate with cooling. Moreover, the reaction speed can be controlled by regulating the rate of feed of hydrochloric acid.

The advantage of the process of the present invention consists, above all, in the fact that, in addition to the α-ketoaldehydes, only triphenylphosphine oxides and gaseous reaction products are formed. The termination of the reaction can be easily observed at the cessation of the evolution of gas. The ketoaldehydes can be separated from the triphenylphosphine oxide formed likewise as reaction product, provided the α-ketoaldehyde is sufficiently volatile, by distillation in vacuo. Another possibility consists in separating the dicarbonyl compound by means of 1,2-dianilino ethane, with which the triphenylphosphine oxide does not react. If the α-ketoaldehyde is soluble in petroleum ether, this solvent can also be used for the separation of the reaction products. Triphenylphosphine oxide is almost insoluble in petroleum ether, so that when the reaction mixture is treated with petroleum ether the α-ketoaldehyde dissolves in the solvent and can be recovered from the latter by evaporation. Another possibility of separation consists in completely evaporating the reaction solution, dissolving the residue in ether and cooling to deep temperatures the ether solution obtained after drying. Thereby the triphenylphosphine oxide crystallizes out to a large extent. If this method should fail, it is also possible to add anhydrous zinc chloride to the ethereal solution whereby an addition compound of triphenylphosphine oxide and zinc chloride is caused to precipitate. After having filtered off the precipitate, the ether solution is washed with water, then with sodium bicarbonate solution and eventually again with water. After drying and removing the solvent by distillation, the α-ketoaldehyde remains behind as residue. Separation of the α-ketoaldehyde from the reaction mixture with steam is also possible if the α-ketoaldehyde is volatile with steam, because the triphenylphosphine oxide does not pass over under these conditions.

Hence, the α-ketoaldehydes as such can be easily isolated. Moreover, it is possible to precipitate the compounds by means of 1,2-dianilino ethane as 1,3-diphenyl-tetrahydroimidazole derivatives. This latter possibility of isolation is particularly suitable for α-ketoaldehydes which carry an aromatic ring in vicinity of the keto group, for example, phenylglyoxal, p-nitrophenylglyoxal, α-naphthylglyoxal, and the like. From these N-acetal-like imidazole derivatives the α-ketoaldehydes can be easily liberated by mineral acids. The process is, therefore, also very suitable for purifying the products.

Due to their excellent activity, particularly against influenza viruses, the products of the present invention can be used as medicaments partly directly or after having been converted into the corresponding sodium bisulfite addition products.

The following examples illustrate the invention but they are not intended to limit it thereto:

Example 1

To a suspension of 20 grams of phenylglyoxal-triphenylphosphazine in 200 cc. of acetone is added a solution of 8 grams of sodium nitrite in 50 cc. of water, and to this mixture are then added dropwise, while stirring and cooling with ice water, 30 cc. of concentrated hydrochloric acid diluted with water in a ratio of 1:1. The reaction mixture is allowed to stand for 30 to 60 minutes until the evolution of gas ceases and subsequently the acetone is distilled off in vacuo at room temperature. The residue is extracted with ether, the ethereal phase is washed with sodium bicarbonate solution, and, after drying over magnesium sulfate, the solvent is distilled off. The remaining residue is distilled in the oil pump vacuum. There are obtained 4.6 grams (=70% of the theoretical yield) of phenylglyoxal in the form of a yellow oil having a boiling point of 70 to 80° C. at a pressure of 1.2 mm. Hg; when standing for a prolonged time the oil polymerizes.

Example 2

To a suspension of 3.5 grams of p-nitrophenylglyoxal-triphenylphosphazine in 30 cc. of acetone is added a solution of 1.5 grams of sodium nitrite in 10 cc. of water. Into the mixture are then introduced, while stirring and cooling, 5.8 cc. of concentrated hydrochloric acid diluted with water in a ratio of 1:1. After standing for one hour at room temperature, the evolution of gas is terminated. The acetone is distilled off in vacuo at a bath temperature of 30–40° C., and the distillation residue is extracted with ether. The ethereal phase is liberated from solvent without further drying and to the residue is added a solution of 3 grams of 1,2-dianilino ethane in 10 cc. of acetone and 0.5 cc. of glacial acetic acid. The whole is then boiled under reflux for 15 minutes and the solvent is allowed to evaporate over night. 30 cc. of methanol are added to the residue which, after having been allowed to stand for a short time, is filtered and washed with methanol. There are obtained 2.22 grams (=73% of the theoretical yield) of the dianilino-ethane derivative of p-nitrophenylglyoxal in the form of red brown crystals which can be recrystallized from a small quantity of acetone. The compound melts at 176–178° C.

Example 3

3.5 grams of α-naphthylglyoxal-triphenylposphazine are suspended in 30 cc. of acetone and to this suspension is added a solution of 1.3 grams of sodium nitrite in 10 cc. of water. To this mixture 7.8 cc. of concentrated hydrochloric acid diluted with water in a ratio of 1:1 are added dropwise, while stirring and cooling. The reaction mixture is then worked up in the manner described in Example 2. There are obtained 2.4 grams (=83% of the theoretical yield) of the α-naphthylglyoxal derivative in the form of colorless crystals having a melting point of 180–181° C. The compound can be recrystallized from a mixture of toluene and methanol (3:2).

Example 4

To a solution of 7.0 grams of methylglyoxal-triphenylphosphazine in 50 cc. of dioxane is added a solution of 3 grams of sodium nitrite in 10 cc. of water. To this solution are added, while cooling and stirring, 18 cc. of concentrated hydrochloric acid diluted with water in a ratio of 1:1. In order to determine the yield and to prove that the reaction product is really methylglyoxal, the methylglyoxal formed is dragged, after the evolution of gas has ceased, by means of steam into a receiving vessel filled with hydrochloric 2,4-dinitrophenyl-hydrazine solution. Thereby the methylglyoxal-bis-2,4-dinitro-phenyl-hydrazone separates and is then vacuum filtered and washed with alcohol and ether. The hydrazone is obtained in a yield of 7.3 grams (=85% of the theoretical yield) and melts at 298° C.

Example 5

To a solution of 1.27 grams of phenylglyoxal-1-hydrazone in 30 cc. of acetone is added a solution of 1.3 grams of sodium nitrite in 15 cc. of water, and into this mixture are then introduced dropwise, while stirring and cooling, 30 cc. of 2N-hydrochloric acid. The reaction mixture is allowed to stand for one hour at room temperature, whereafter the acetone and one part of the water are distilled off in vacuo at room temperature. The residue is extracted with ether and the ethereal phase is liberated from solvent in vacuo without intermediate drying. A solution of 3.5 grams of 1,2-dianilinoethane in 10 cc. of acetone is then added to the residue. After addition of 0.5 cc. of glacial acetic acid, the reaction mixture is refluxed for 15 minutes and poured in a Petri dish. The solvent is allowed to evaporate over night, and to the residue are added 30 cc. of methanol. The crystals formed are filtered with suction and washed with methanol. There are obtained 2.1 grams (=72% of the theoretical yield) of phenylglyoxal in the form of the 1,3-diphenyl-tetrahydroimidazole derivative having a melting point of 107° C.

We claim:

1. A process for preparing α-ketoaldehydes which comprises contacting a compound having a formula selected from the group consisting of

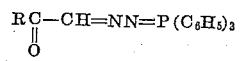

and

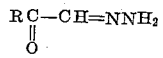

wherein R is a member selected from the group consisting of alkyl, hydroxyalkyl, methoxyalkyl, ethoxyalkyl, phenyl, naphthyl, and nitrophenyl, with nitrous acid.

2. A process as in claim 1 wherein said nitrous acid is generated in situ by acidifying a member of the group consisting of alkyl nitrites and aqueous solutions of alkali metal nitrites.

3. A process as in claim 1 wherein the reactants are contacted in a water miscible organic solvent inert to the reaction.

4. A process as in claim 1 wherein the reactants are contacted in an organic solvent selected from the group consisting of acetone, dioxane, tetrahydrofurane, dimethylformamide, dimethylsulfoxide, and acetonitrile.

5. A process as in claim 4 wherein nitrous acid is generated in situ by acidifying an aqueous solution of sodium nitrite with hydrochloric acid.

No references cited.